(12) United States Patent
Luebke (10) Patent No.: US 6,926,473 B2
(45) Date of Patent: Aug. 9, 2005

(54) HAND DRILL ATTACHMENT

(75) Inventor: Thomas M. Luebke, Menomonee Falls, WI (US)

(73) Assignee: Actuant Corporation, Milwaukee, WI (US)

( * ) Notice: Subject to any disclaimer, the term of this patent is extended or adjusted under 35 U.S.C. 154(b) by 370 days.

(21) Appl. No.: 09/884,518

(22) Filed: Jun. 19, 2001

(65) Prior Publication Data

US 2001/0053313 A1 Dec. 20, 2001

Related U.S. Application Data

(60) Provisional application No. 60/212,867, filed on Jun. 20, 2000.

(51) Int. Cl.[7] .............................................. B23B 45/00
(52) U.S. Cl. ..................................... 408/16; 408/241 R
(58) Field of Search ............................... 1108/16, 124, 1108/241 R (56) References Cited

U.S. PATENT DOCUMENTS

| 4,099,118 A | | 7/1978 | Franklin et al. |
|---|---|---|---|
| 4,270,041 A | | 5/1981 | Pleyber |
| 4,464,622 A | | 8/1984 | Franklin |
| 4,508,221 A | * | 4/1985 | Olson |
| 4,797,040 A | * | 1/1989 | Hibbard |
| 4,954,026 A | * | 9/1990 | Zurwelle |
| 5,074,081 A | * | 12/1991 | Beth et al. |
| 5,148,108 A | | 9/1992 | Dufour |
| 5,170,545 A | * | 12/1992 | Hubscher |
| 5,352,974 A | | 10/1994 | Heger |
| 5,484,026 A | * | 1/1996 | Susaki et al. |
| 5,485,092 A | | 1/1996 | Fortin |
| 5,562,240 A | * | 10/1996 | Campbell |
| 5,619,128 A | | 4/1997 | Heger |
| 5,812,057 A | | 9/1998 | Hepworth et al. |
| 5,954,458 A | * | 9/1999 | Lee |
| D419,546 S | | 1/2000 | Krantz et al. |
| 6,023,159 A | | 2/2000 | Heger |
| 6,215,293 B1 | | 4/2001 | Yim |
| 6,334,743 B1 | * | 1/2002 | Liao |
| 6,364,580 B1 | * | 4/2002 | Dils et al. |

FOREIGN PATENT DOCUMENTS

WO    WO 00/79305 A1    12/2000

* cited by examiner

*Primary Examiner*—William M. Pierce
(74) *Attorney, Agent, or Firm*—Quarles & Brady LLP (57) ABSTRACT

A power hand drill has a subsurface object locator for detecting the presence of an object beneath a surface being probed with the locator. The drill has a housing with a flat accessory mounting surface having a pair of attachment tabs. The locator has a locator housing with a flat base and a pair of key hole slots engaged with the tabs for detachably mounting the locator housing to the accessory mounting surface of the drill housing. The locator includes sensing circuitry contained within the locator housing for detecting subsurface objects and has an object indicator mounted to the locator housing and connected to the sensing circuitry for indicating the presence of a subsurface object. A contoured surface on the locator housing provides a handrest for gripping when operating the drill.

10 Claims, 7 Drawing Sheets

HAND DRILL ATTACHMENT

CROSS-REFERENCE TO RELATED APPLICATIONS

This application claims the benefit of U.S. provisional application Ser. No. 60/212,867 filed Jun. 20, 2000.

STATEMENT REGARDING FEDERALLY SPONSORED RESEARCH/DEVELOPMENT

Not applicable.

FIELD OF THE INVENTION

This invention relates to attachments for hand drills, and in particular to a subsurface object locator attachment to a hand drill, sometimes known as a stud finder, for detecting a stud or other object behind an opaque surface, such as wall board.

BACKGROUND OF THE INVENTION

Carpenters, electricians, do-it-yourselfers and others are often faced with the problem of locating the position of the wall studs behind the wall board material forming the wall surface. They are interested in hanging pictures, drilling holes and so on. However after the walls are finished and painted the location of the hidden substructure (i.e. the studs) is not visually detectable. The same is true of finding the location of hidden wooden frames in furniture and boats from the outside surface of the structure.

Handheld electronic stud finders are well known. For example, U.S. Pat. No. 4,099,118 issued Jul. 4, 1978 discloses an electronic wall stud sensor which is suitable for detecting a wall stud behind a wall surface. This stud sensor uses electronic sensing circuitry to accurately determine the location of the stud behind the walls by activating the circuitry, holding the device near or against the wall and slowly moving the device until the stud is detected.

When using a stud finder, it is often necessary to also use a power drill and screw driving device for making holes in the wall and mounting a fastener. Since the two devices are often used together it would be convenient and efficient to have a single device which would perform both functions. Unfortunately, the sensing electronics of the stud finder can be affected by other electronics making it less accurate, and thus, cannot be incorporated into the drill without suitable shielding. Moreover, the sensing circuitry needs to be held near or against the surface being probed, which would be difficult if made a part of the drill.

SUMMARY OF THE INVENTION

The invention provides a new device capable of efficiently finding the location of hidden objects or substrata such as studs, joists and other similar objects below the surface of walls, floors and similar type structures. The device may also be used to find the location of braces, wood frames or other substructures in wooden furniture such as tables and cabinets, wooden boats and similar type structures.

Specifically, the invention provides a subsurface object locating accessory for a hand drill having a drill housing. The locator includes an accessory housing having a substantially flat surface and an attachment member for detachably mounting the accessory housing to the drill housing. The locator has sensing circuitry contained within the accessory housing for detecting subsurface objects and an object indicator mounted to the accessory housing and connected to the sensing circuitry for indicating the presence of a subsurface object.

In a preferred form, the locator housing is shaped to provide a handrest for operating the drill. The substantially flat surface interfaces with the drill and an attachment member is located adjacent the substantially flat surface and forms part of a connection joining the accessory housing to the drill housing.

The invention also provides a hand drill, which may be corded or cordless, that has a subsurface object locator detachably incorporated into its housing. The subsurface object locator is attached to the housing of the drill with a snap or other appropriate detachable fit, so that it may be carried to the work site as part of the drill, detached from the drill at the work site and used to probe a wall surface, and reattached to the drill housing when probing of the wall surface is finished.

The locator can be moved across the wall to locate subsurface objects like wall studs. It senses any change in the dielectric constant of the wall material caused by the location of a subsurface object. It contains automatic circuitry for sensing the frequency change caused by the object and measuring the frequency shift. An LED (light emitting diode) display indicates the presence of the object.

The foregoing and other objects and advantages of the invention will appear in the detailed description which follows. In the description, reference is made to the accompanying drawings which illustrate a preferred embodiment of the invention.

DETAILED DESCRIPTION OF THE PREFERRED EMBODIMENT

Referring to FIGS. 1–4, a drill 10 of the invention includes a subsurface object locator 12 detachably mounted to the drill housing 14. The drill 10 as illustrated is a cordless drill, although it could be provided with a cord for power with the locator 12 in the same position. Referring particularly to FIGS. 5a–5e, the locator 12 has a main housing 16 which is contoured to fit to the shape of the housing 14 and provide a handrest 18 at the rear of the housing 16 which is contoured to fit a user's hand and provide a surface for thrusting against the rear of the drill with the users hand so as to operate the drill. The main housing 16 also has a buttonhole 20 into which the button 22 (FIGS. 6a–6d) fits for turning on the locator. The housing 16 also has indicator light openings 24 which are covered with an appropriate lens so that an indication of when the locator 12 senses a subsurface object can be given to the user by illuminating LEDs through the windows 24 as more fully described below. In addition, the housing 16 has a tongue 26 extending from its front end which fits into a slot 27 of the housing 14 to help secure the locator 12 and align it to the contours of the housing 14.

Figure 7A:
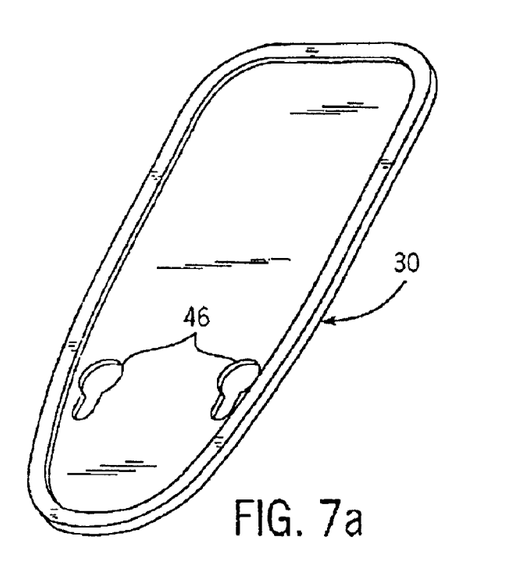
FIGS. 7a–7c are perspective (FIG. 7a), top (FIG. 7b), and side (FIG. 7c) views of a bottom cover for the subsurface object locator.
Figure 7B:
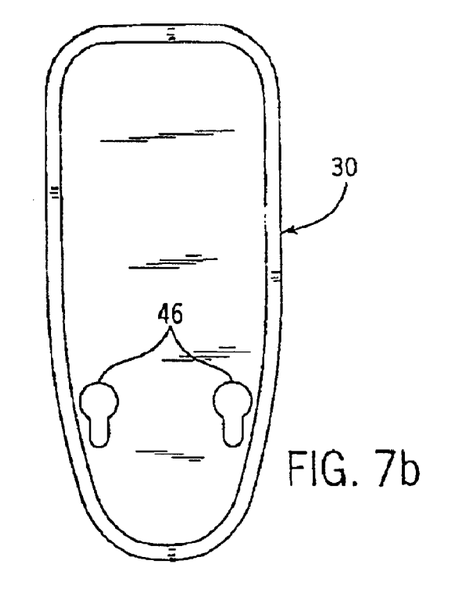
Figure 7C:
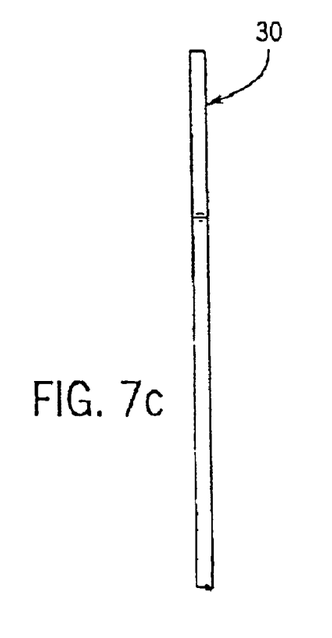
Figure 8A:
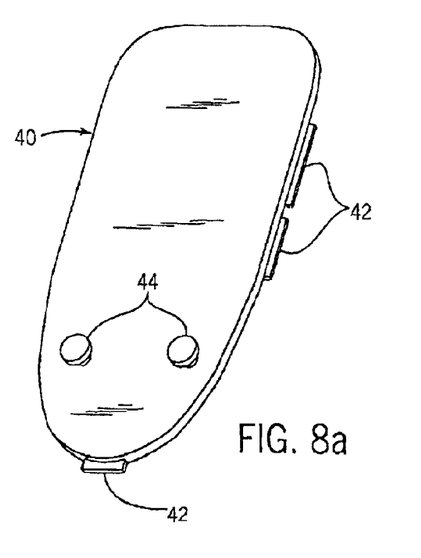
FIGS. 8a–8e are perspective (FIG. 8a), top plan (FIG. 8b), side (FIG. 8c), bottom (FIG. 8d), and rear (FIG. 8e), views of a mounting plate which forms a part of the housing of the drill and detachably mounts the subsurface object locator.
Figures 8B, 8C, 8D, 8E:
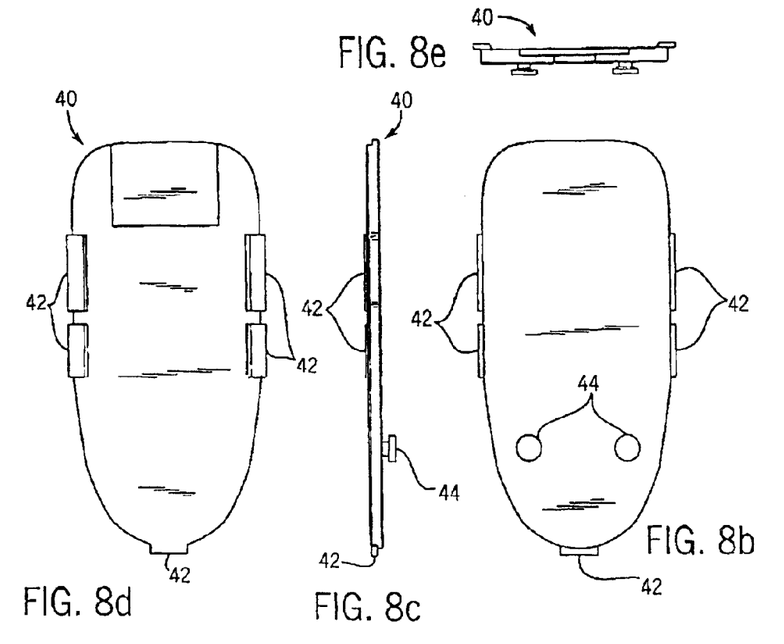

As shown in FIGS. 7a–7c, a back plate 30 is attached to the bottom of the housing 16 by any suitable means, such as glue, ultrasonic welding or other means. A sensor plate 71 (see FIG. 9) is made substantially as large as the bottom plate 30, to maximize the sensitivity of the subsurface object locator. The circuitry of the locator is housed between the bottom plate 30 and the housing 16, and is operated by the button 22. Thus, to sense a subsurface object, the locator 12 is removed from the drill housing 14, and its bottom is slid over the surface being sensed while holding down the button 22. The indicator lights visible through openings 24 then indicate the edges of the subsurface object.

Figure 1:
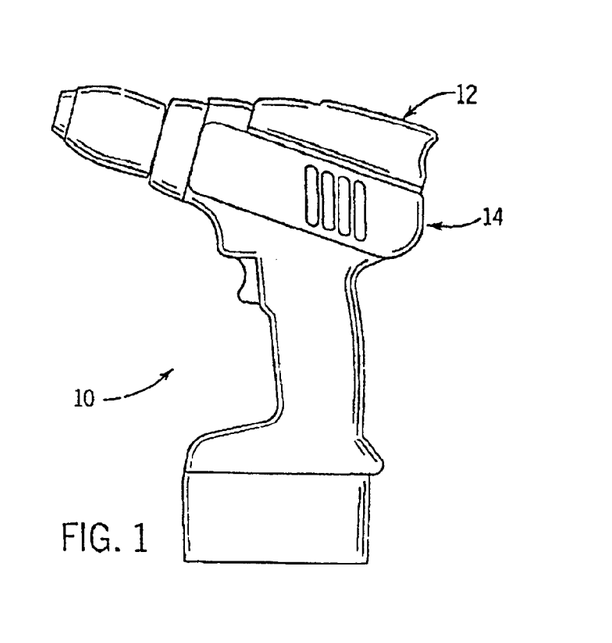
FIG. 1 is a perspective view of a cordless hand drill including a subsurface object locator of the invention.
Figures 2, 3:
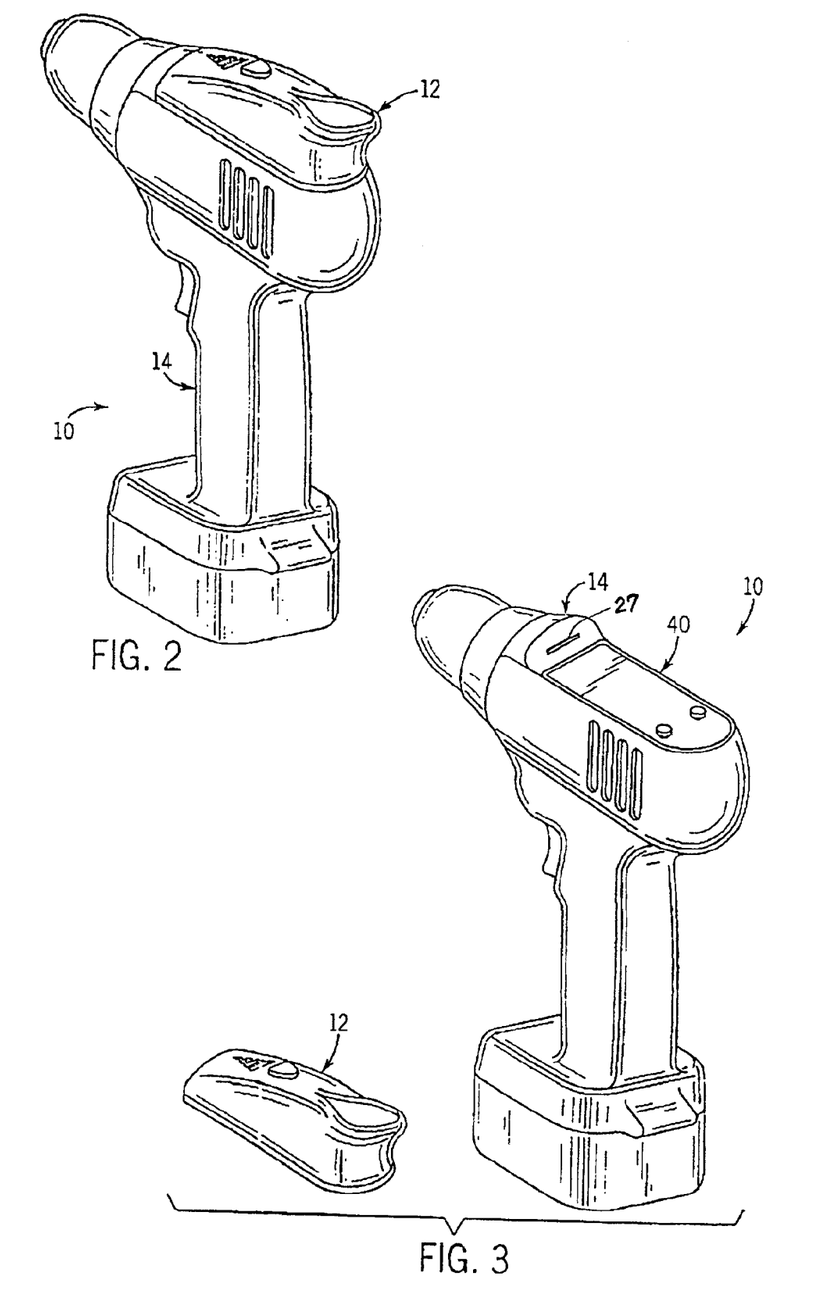
FIG. 2 is a view similar to FIG. 1 from a different angle.
FIG. 3 is a view similar to FIG. 2 but with the subsurface object locator removed from the drill housing.
Figure 4:
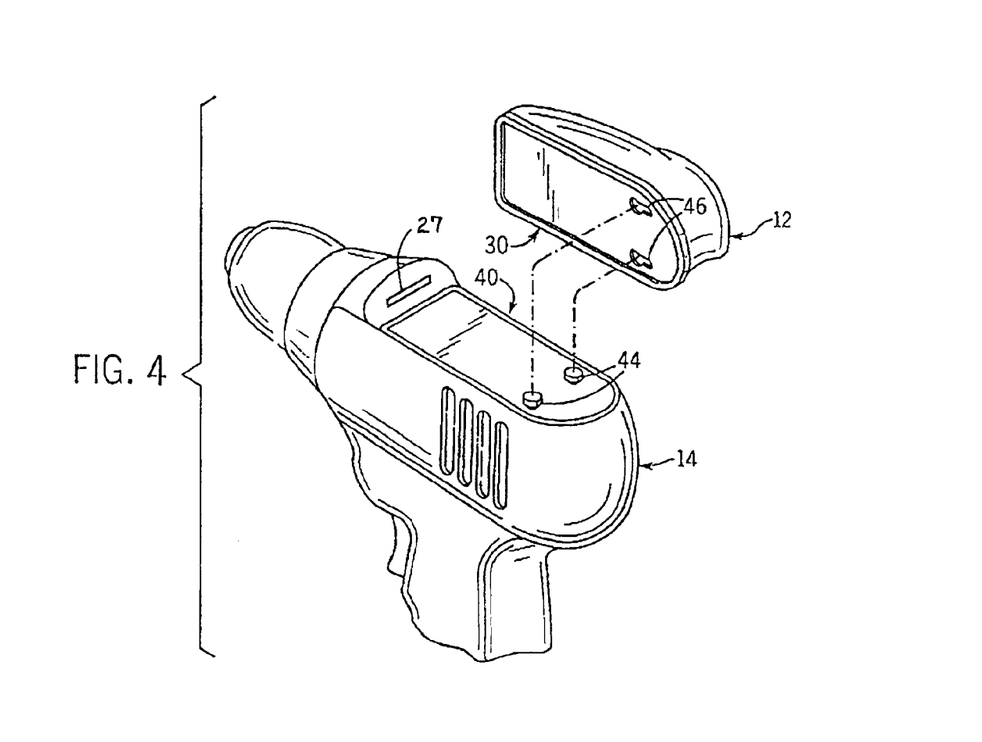
FIG. 4 is a view similar to the preceding views but showing how the subsurface object locator is reattached to the drill housing.
Figure 5A:
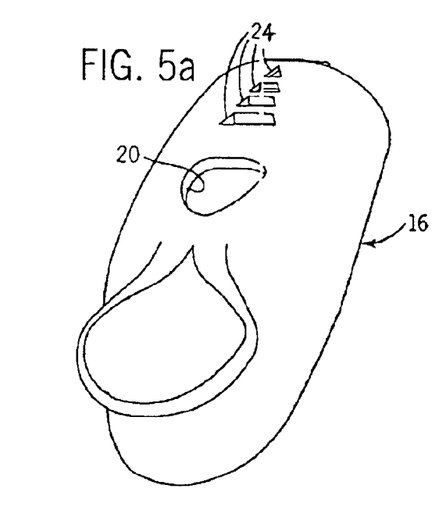
FIGS. 5a–5e are perspective (FIGS. 5a and 5b), top (FIG. 5c), side (FIG. 5d), front (FIG. 5e) and rear (FIG. 5f) views of the main housing of the subsurface object locator.
Figure 5B:
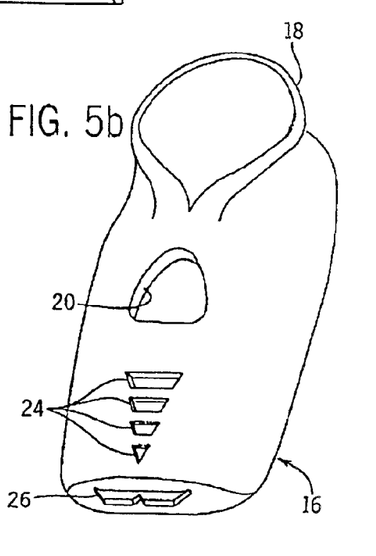
Figure 5C:
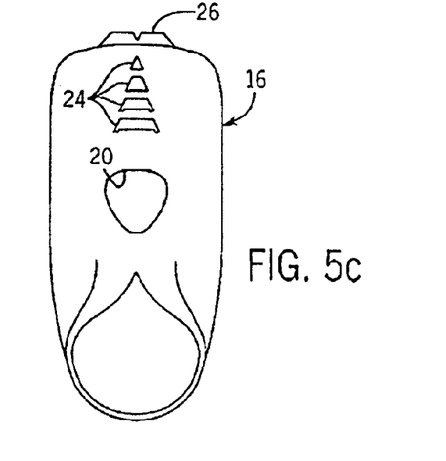
Figure 5D:
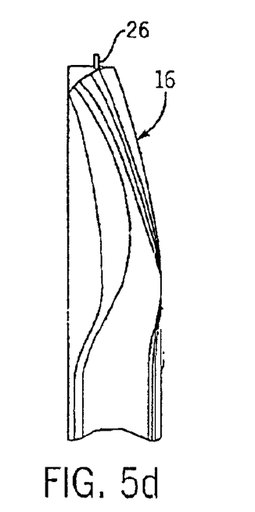
Figure 5E:
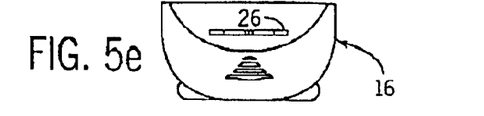
Figure 5F:
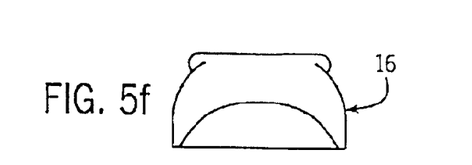
Figure 6A:
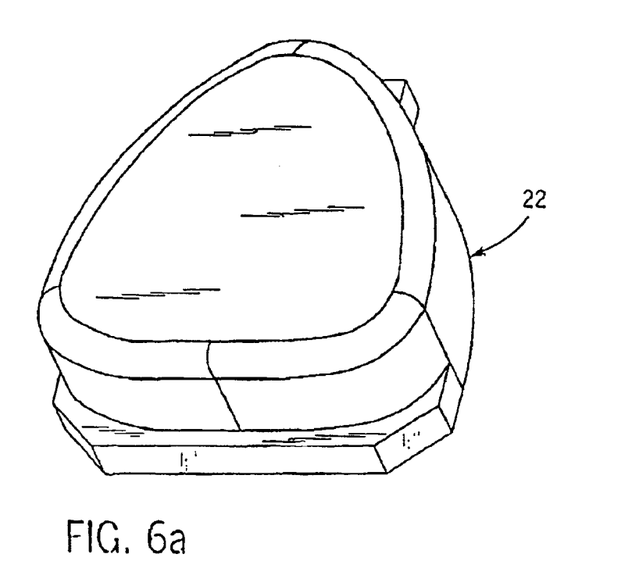
FIGS. 6a–6d are perspective (FIG. 6a), top (FIG. 6b), side (FIG. 6c), and front (FIG. 6d) views of a button for the subsurface object locator.
Figure 6B:
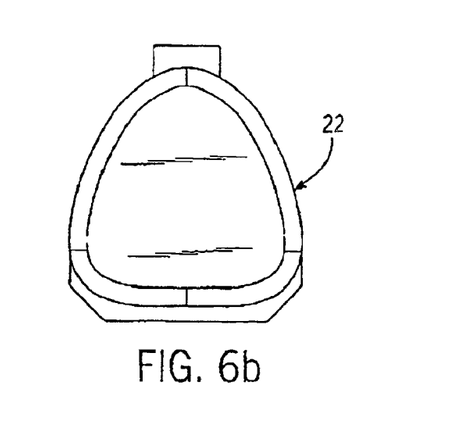
Figure 6C:
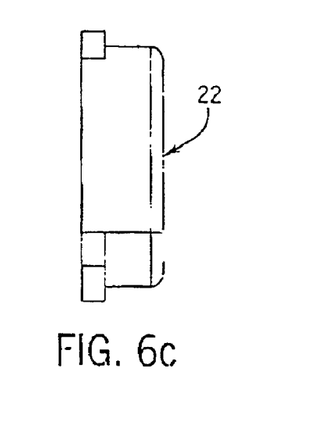
Figure 6D:
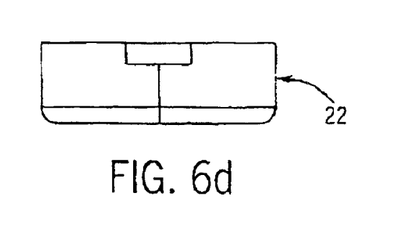

Referring to FIGS. 8a–8e, and also FIG. 3 and FIG. 4, a mounting plate 40 for mounting the locator 12 is fixed to the drill housing 14 by any suitable means. As illustrated, the plate 40 is fixed with a snap fit, having tabs 42 around its periphery which fit with corresponding slots or grooves in housing 14 to secure the plate 40. Any other suitable attachment means such as screws, adhesive or other means may also be used.

The plate 40 has two projections 44 with enlarged heads which fit into keyhole shaped openings 46 in the plate 30 to secure the locator 12 to the housing 14. As mentioned above, the tongue 26 of the housing 16 fits into a correspondingly shaped opening in the housing 14 when the projections 44 are fit into the large ends of the openings 46 and the locator 12 is slid forward so as to secure it with a friction fit of the projections 44 entering the small ends of the openings 46. Any other detachable connection of the locator 12 to the housing 14 could also be used.

Figure 9:
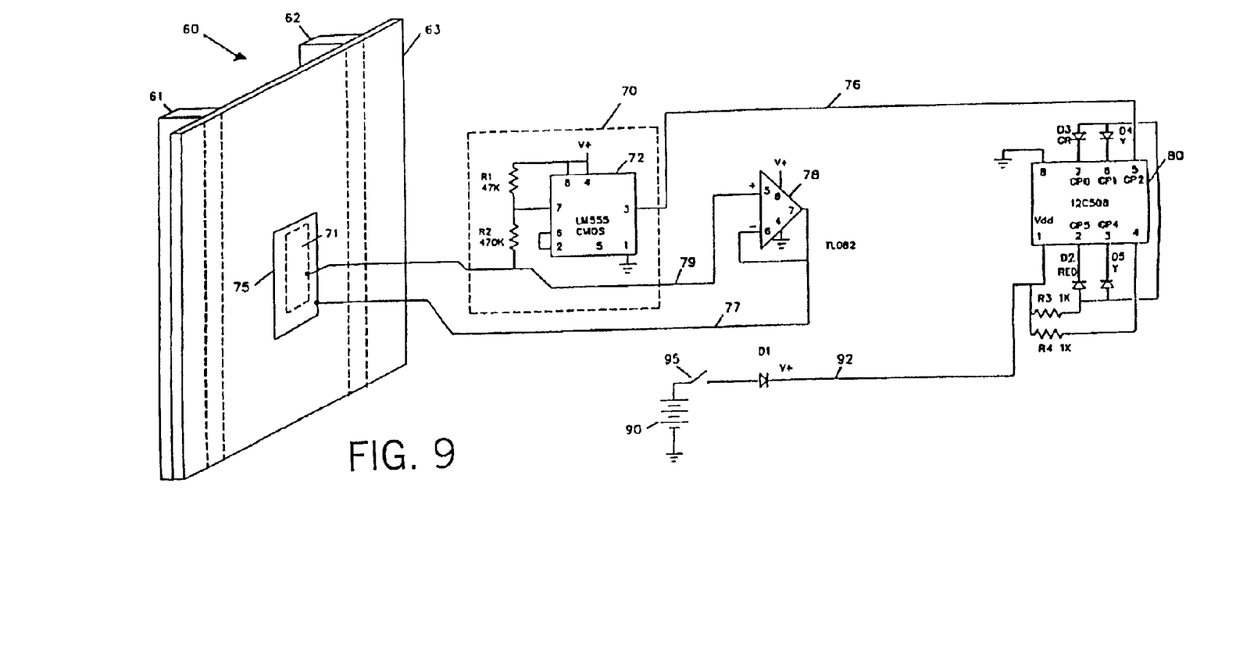
FIG. 9 is a schematic diagram of a circuit for practicing the invention.

Shown in FIG. 9 is a portion of a wall structure 60, studs 61, 62 and wall board 63 to be illustrative of one way of operating the invention. In this case, it is desired to locate the positions of the hidden studs 61 and 62. Although any suitable circuitry can be used, one possible circuit (shown in FIG. 9) includes a metallic sensor plate 71 connected to a CMOS oscillator 70 which produces a square (or rectangular) wave output. The circuit consists of a timer IC 22, the sensor plate and resistors. The frequency of the oscillator 70 is determined by IC 72, the values of resistors R1 and R2 and the capacitance presented by the plate 71.

Figure 10:
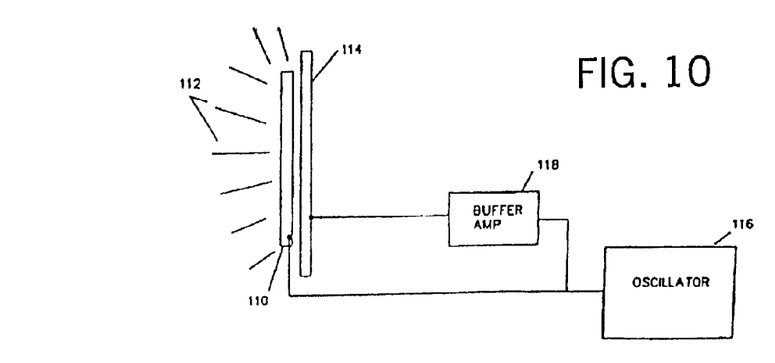
FIG. 10 is a schematic diagram illustrating the operation of the circuit.

Referring to FIGS. 9 and 10, when the sensor plate 71 is above a section of the wall with no studs it will cause the oscillator 70 to run at a first frequency (f1). When the sensor is above a section of the wall that has a stud below it the oscillator will have a different frequency (f2). The capacitance of the plate 71 is determined by the surrounding medium including the wall material, the studs, the circuit and the person holding the device. It is desirable to reduce the stray capacitance as much as possible since this will improve the sensitivity of the plate 71. The capacitance of plate 71 is influenced considerably by the operator and the housing of the device.

Capacitance is related to its potential with respect to other objects. If an additional plate 75 is introduced in the vicinity of plate 71 with the same potential as plate 71, it will reduce the "stray" effects. This improves the sensitivity of the plate 71 and allows it to sense further into the wall.

The potential of plate 71 changes as the oscillator 70 operates. In a typical situation it may vary from 0 to 5 volts in amplitude. Hence the guard plate 75 must have its potential vary in the same way. This is accomplished by using a buffer amplifier 78, with a gain of one, which has the voltage of the sensor plate 71 at its input and produces a near exact replica of it at its output, which is connected to plate 75 via line 77. Hence plate 75 is driven at the same potential as plate 71.

As shown in FIG. 10, the sensor plate 71 is connected to the oscillator 70 and the guard plate 75 is driven from amplifier 78 so it has the same potential as the sensor plate 71. The E-field 100 is now prevented from going in the direction of the guard plate 75. This is because both plates are at the same potential and by electrical laws there can be no E-field between conductors of the same potential. With fewer E-field lines, there is less capacitance of sensor plate 71. Hence it will be more responsive to dielectric changes in the direction opposite to the guard plate 75. The guard plate 75 may be somewhat larger than the sensor plate 71 so as to extend beyond the edges of the sensor plate 71, which redirects the E-field lines emanating from the edges of the sensor plate 71 in the direction toward the surface being probed.

The microprocessor circuit 80 is programmed to measure the frequency difference f1 minus f2, which can be done by any suitable means. For example, the microprocessor circuit 80 will typically include a counter. The counter can be programmed to count the number of times the oscillator output signal to the microprocessor goes high in a certain period, which yields a measure of the frequency of the oscillator output. If the frequency difference between the first measured frequency and the subsequently measured frequencies exceeds an amount deemed sufficient to indicate the presence of a stud, an LED is turned on.

The circuit 80 actually has four LEDs D2, D3, D4 and D5 that can be activated at different amounts of frequency change. More or fewer LEDs could be used as indicators depending upon resolution and cost considerations. The circuit is powered by batteries 90 (e.g., four 1.5V pancake cells) through protective diode D1 (e.g., a 1N270 diode) and line 92. Resistor R3 is used to limit the current in the LEDs. Resistor R4 is used for a power on reset for circuit 80. Button 22 operates switch 95 to enable power to circuit from the battery 90 to circuit 80.

Although visual LED indicators D2–D5 are described here, it should be clear that audible indicators could be used as well. For example, different audible tones could be produced corresponding to various frequency differences encountered in scanning the wall, as the leading edge of a stud was approached, the frequency could go up, and as the trailing edge of the stud was passed the frequency could go down. In fact, there are occasions where audible indications may be better, such as in cases where the visible indicators may be hard to see.

As the sensor is moved along the wall the frequency changes. As the frequency decreases, the circuit 80 senses this change and turns on one or more of the LEDs D2–D5. The LEDs could be turned on so as to overlap in on-times or not. In the preferred embodiment, the on-times do not overlap to preserve battery power.

To use the device described, the sensor plate 71 is placed on or in close proximity to the wall where there are no studs and the button 22 is pressed which closes the switch 95. This causes circuit 80 to be activated and it will measure the first frequency f1 from the oscillator 70 and save it in memory. After this step is performed, which takes less than a second, the lowest LED D3 (green) comes on and stays on as a power indicator, while the button 22 is pressed. This signals to the operator that the device can now be moved across the wall being probed. As the sensor is moved across the wall the circuit 80 is continuously measuring the second or subsequent frequency f2 from oscillator 70 and comparing it to the first frequency f1 by taking the frequency difference. When the difference exceeds a first threshold, the next LED up, LED D4 (amber) will be lit and LED D3 will go out. When the difference exceeds a second threshold, greater than the first threshold, the next LED D5 (amber) will be turned on and LED D4 will go out. When the difference exceeds a third threshold, greater than the second threshold and which indicates the presence of the leading edge of the stud, the highest LED D2 (red) goes on and the LED D5 goes out. LED D2 stays on as the thickness of the stud is traversed by the device. When the trailing edge of the device is reached, the LEDs go off and on in the reverse sequence. Thus, a user trying to find a stud, will mark the leading edge of the stud when LED D2 comes on, and will mark the trailing edge of the stud when the LED D2 goes off.

When a user first puts the device against a wall or other surface to be probed, there is no way of telling if it is initially placed over a stud or other subsurface object or not. The device assumes that it is not. However, if by chance it is, then the subsequently found frequency difference will be negative and unless special provision is made in the programming of the microprocessor, an error will result. It is an easy matter, however, to program the microprocessor so that if the f1–f2 frequency difference is found to be negative, it means that the device was initially placed over a stud or other subsurface object. The device could be programmed to flash the LEDs or beep a buzzer in that event to alert the user to start over, placing the device in a different initial position.

A preferred embodiment of a drill including an attachment of the invention has been described in particular detail. Many modifications and variations of the embodiment described will be apparent to those skilled in the art. Therefore, the invention is not limited to the embodiment described but should be defined by the claims which follow.

I claim:

1. A subsurface object locating accessory for use with a hand drill having a drill housing, the accessory comprising:

an accessory housing having a substantially flat surface for sliding across a wall surface and an attachment member located adjacent the substantially flat surface and including a keyhole slot having an enlarged area and a narrowed area sized and dimensioned to receive a projecting attachment member in the drill housing for detachably mounting the accessory housing to the drill housing;

sensing circuitry contained within the accessory housing for detecting subsurface objects probed by said accessory; and an object indicator connected to the sensing circuitry for indicating the presence of a subsurface object.

2. The drill accessory of claim 1, wherein the accessory housing has two laterally spaced key hole slots, each of the keyhole slots being sized and dimensioned to receive an attachment member in the drill housing.

3. The drill accessory of claim 2, wherein the substantially flat surface of the accessory housing comprises a base plate, the key hole slots being defined in the base plate.

4. The drill accessory of claim 3, wherein the base plate is sized and dimensioned to be received in a mounting plate in the drill housing, the key hole slots in the base plate being removably attachable to a corresponding attachment member in the drill housing.

5. A hand drill including a detachable subsurface object locator accessory for detecting the presence of an object beneath a surface being probed with the locator, comprising:

a drill housing defining an accessory mount having a mounting surface for receiving a substanially flat surface and including a first attachment member;

a locator housing having a substanially flat bottom surface for sliding along a surface to be probed, the substanially flat bottom surface including a second attachment member engaged with the first attachment member for detachably mounting the locator housing to the accessory mounting surface of the drill housing;

sensing circuitry contained within the locator housing for detecting subsurface objects; and an object indicator connected to the sensing circuitry for indicating the presence of a subsurface object.

6. The hand drill of claim 5, wherein the second attachment member is a slot.

7. The hand drill of claim 6, wherein the first attachment member is a projecting attachment tab sized and dimensioned to be received in the slot.

8. The hand drill of claim 6, wherein the slot comprises a keyhole slot.

9. The hand drill of claim 7, wherein the second attachment member comprises a key hole slot having an enlarged area and a narrowed area, and the projecting attachment tab of the first attachment member is smaller than the enlarged area of the key hole slot in the second attachment member and larger than the narrowed area of the key hole slot in the second attachment member.

10. A hand drill including a detachable subsurface object locator accessory for detecting the presence of an object beneath a surface being probed with the locator, comprising:

a drill housing defining an accessory mount having a mounting surface for receiving a substantially flat surface and including a projecting attachment tab;

a locator housing having a substantially flat bottom surface for sliding along a surface to be probed, the substantially flat bottom surface including a slot sized and dimensioned to engage with the projecting attachment tab for detachably mounting the locator housing to the accessory mounting surface of the drill housing;

sensing circuitry contained within the locator housing for detecting subsurface objects; and an object indicator connected to the sensing circuitry for indicating the presence of a subsurface object.

* * * * *

UNITED STATES PATENT AND TRADEMARK OFFICE
CERTIFICATE OF CORRECTION

| | | |
|---|---|---|
| PATENT NO. | : 6,926,473 B2 | Page 1 of 1 |
| APPLICATION NO. | : 09/884518 | |
| DATED | : August 9, 2005 | |
| INVENTOR(S) | : Thomas M. Luebke | |

It is certified that error appears in the above-identified patent and that said Letters Patent is hereby corrected as shown below:

Column 6, Line 5 (Claim 3):

"substanially" should be --substantially--.

Column 6, Line 18 (Claim 5):

"substanially" should be --substantially--.

Column 6, Line 20 (Claim 5):

"substanially" should be --substantially--.

Column 6, Line 21 (Claim 5):

"substanially" should be --substantially--.

Column 6, Line 37 (Claim 8):

"slot" should be --shape-- 2nd occurrence.

Signed and Sealed this

Nineteenth Day of December, 2006

JON W. DUDAS
*Director of the United States Patent and Trademark Office*